(12) United States Patent
Rogg (10) Patent No.: US 11,173,811 B2
(45) Date of Patent: Nov. 16, 2021

(54) SEAT FRAME FOR A SEAT ARRANGEMENT OF A VEHICLE

(71) Applicant: Aguti Produktentwicklung & Design GmbH, Langenargen (DE)

(72) Inventor: Christian Rogg, Wasserburg (DE)

(73) Assignee: Aguti Produktentwicklung & Design GmbH, Langenargen (DE)

( * ) Notice: Subject to any disclaimer, the term of this patent is extended or adjusted under 35 U.S.C. 154(b) by 222 days.

(21) Appl. No.: 16/506,237

(22) Filed: Jul. 9, 2019

(65) Prior Publication Data

US 2020/0017001 A1 Jan. 16, 2020

(30) Foreign Application Priority Data

Jul. 13, 2018 (DE) ............. 10 2018 117 026.2

(51) Int. Cl.
*B60N 2/34* (2006.01)
*A47C 17/16* (2006.01)
(Continued)

(52) U.S. Cl.
CPC ............ *B60N 2/2222* (2013.01); *A47C 17/16* (2013.01); *B60N 2/34* (2013.01); *B60N 2/682* (2013.01)

(58) Field of Classification Search
CPC .......... B60N 2/34; A47C 17/16; A47C 17/162
See application file for complete search history.

(56) References Cited

U.S. PATENT DOCUMENTS 4,365,369 A * 12/1982 Plume ............... A47C 17/1756
5/38
4,495,887 A * 1/1985 Mondrush ............ A47C 17/161
297/118
(Continued)

FOREIGN PATENT DOCUMENTS

DE 92 01 178 U1 4/1992
DE 44 42 813 A1 6/1995
(Continued)

OTHER PUBLICATIONS

German Search Report (Application No. 10 2018 117 026.2) dated Mar. 8, 2019.
(Continued)

*Primary Examiner* — Timothy J Brindley
(74) *Attorney, Agent, or Firm* — Burr & Brown, PLLC (57) ABSTRACT

Seat frame for a seat arrangement of a vehicle having a seat substructure, a seat surface supporting structure, an attachment structure and a backrest supporting structure. The seat substructure is arranged on a vehicle floor and the seat surface supporting structure fastens a seat surface element of the seat arrangement thereto. The seat surface supporting structure is movable on the seat substructure and/or on the attachment structure. The backrest supporting structure fastens a backrest element of the seat arrangement thereto. The backrest supporting structure is pivotably movable on the seat substructure. The backrest supporting structure is pivotable out of a first use position of the seat frame into a second use position of the seat frame. In the second use position, the backrest supporting structure acts on the seat surface supporting structure and forces the seat surface supporting structure out of the first use position into the second use position.

16 Claims, 4 Drawing Sheets

(51) Int. Cl.
   *B60N 2/22*      (2006.01)
   *B60N 2/68*      (2006.01)

(56)              References Cited

U.S. PATENT DOCUMENTS 4,512,048 A        4/1985  Isham et al.
    4,543,675 A       10/1985  Shrock
    4,625,346 A       12/1986  Quackenbush
 2018/0251052 A1*      9/2018  Line ........................ B60N 2/34
 2020/0156516 A1*      5/2020  Kakishima ............... B60N 2/20

FOREIGN PATENT DOCUMENTS

DE         297 04 735 U1     4/1997
 DE         298 09 834 U1    10/1998
 DE         298 14 554 U1    11/1998

OTHER PUBLICATIONS

Extended European Search Report (Application No. 19184868.8) dated Dec. 9, 2019.

* cited by examiner

SEAT FRAME FOR A SEAT ARRANGEMENT OF A VEHICLE

This application claims the benefit under 35 USC § 119(a)-(d) of German Application No. 10 2018 117 026.2 filed Jul. 13, 2018, the entirety of which is incorporated herein by reference.

FIELD OF THE INVENTION

The present invention relates to a seat frame for a seat arrangement of a vehicle.

BACKGROUND OF THE INVENTION

In the automotive field, different seat arrangements which are designed as an individual seat or seat bench are known. In order to provide the possibility of wider use, it is also known to convert a seat arrangement in a motor vehicle, for example, a passenger motor vehicle or a utility vehicle, such as, for example, a motor home, into a reclining arrangement. To this end, for example, a backrest surface element of the seat arrangement is lowered relative to a seat surface element.

In the case of a seat surface element of the seat arrangement, it may be desired that this seat surface element rises slightly to the front in order to avoid the so-called "diving effect" of a seated person in the event of an impact situation of the vehicle, i.e. slipping through to the front along the seat surface element and optionally below an applied safety belt.

In the known seat arrangements, a conversion and/or adjustment of the seat arrangement from a seating position into a reclining position in order to obtain amongst other things a comparatively flat reclining surface, is implemented in a relatively costly and technically complex manner, for the reasons cited above.

SUMMARY OF THE INVENTION

It is the object of the present invention to improve a seat arrangement of the aforementioned type with regard to a conversion into a reclining arrangement.

The present invention is based on a seat frame for a seat arrangement of a vehicle, wherein the seat frame has a seat substructure, a seat surface supporting structure, an attachment structure and a backrest supporting structure, wherein the seat substructure is configured to be arranged on a vehicle floor of a vehicle, wherein the seat surface supporting structure is configured to fasten a seat surface element of the seat arrangement thereto, wherein the seat surface supporting structure is movably articulated on the seat substructure and/or movably articulated on the attachment structure, wherein the backrest supporting structure is configured to fasten a backrest element of the seat arrangement thereto, wherein the backrest supporting structure is articulated on the seat substructure in a pivotably movable manner.

The backrest supporting structure and the seat surface supporting structure are advantageously present separately from one another. The backrest element and the seat surface element are preferably present separately from one another. Preferably, the backrest supporting structure and the seat surface supporting structure are not connected together, in particular, not directly connected together. Advantageously, the backrest element and the seat surface element are not connected together, in particular, not directly connected together.

The essential idea of the present invention is that the seat frame is present such that the backrest supporting structure is pivotable out of a first use position of the seat frame into a second use position of the seat frame, wherein in the second use position the backrest supporting structure acts on the seat surface supporting structure and forces the seat surface supporting structure out of the first use position into the second use position.

In particular, the ease of use of the seat arrangement is primarily increased by means of the present invention. Thus a reclining position and/or reclining arrangement may be achieved, the provided reclining surface thereof being configured in an ideal manner for comfortable reclining, in particular, as a flattened, in particular, flat, surface. This is in contrast to the known arrangements in which raised regions in the reclining arrangement, for example, a seat surface of the seat surface element rising slightly to the front, are not flattened and perceived as uncomfortable and/or awkward.

The backrest supporting structure advantageously acts from below, for example, from the direction of the vehicle floor, onto the seat surface supporting structure. Preferably, the seat arrangement is configured as a vehicle seat, in particular, as a vehicle seat bench. The seat frame is advantageously configured as a seat frame of a vehicle seat, in particular, of a seat bench and reclining bench. The seat frame is, for example, a seat frame and/or reclining bench frame. Advantageously, in the first use position, the seat frame forms a seat arrangement, for example, a vehicle seat or a vehicle seat bench for a passenger of the vehicle. For example, in the second use position, the seat frame forms a reclining arrangement, for example, a reclining bench or a reclining bed. For example, the seat surface element, in particular, the seat surface supporting structure, in a first use position, in particular in the first use position of the seat frame, is located in an angled position so that the seat surface of the seat surface element rises slightly to the front, in order to avoid the so-called "diving effect" of a seated person in an impact situation of the vehicle. In a second use position, in particular, in the second use position of the seat frame, the seat surface element, in particular the seat surface of the seat surface element, in particular, is present so as to be aligned parallel to the vehicle floor and/or parallel to the backrest element, in particular parallel to a use surface, for example, a contact surface of the backrest element.

It also proves advantageous if the seat substructure and/or the attachment structure has a bearing surface for the seat surface supporting structure, wherein, in particular, a first backrest strut of the backrest supporting structure extends in a first use position transversely to the bearing surface of the seat substructure and/or transversely to the bearing surface of the attachment structure from a first strut end to a second strut end, wherein the backrest strut is articulated at least in the region of one of the bearing surfaces in a pivotably movable manner on the seat substructure and/or in a pivotably movable manner on the attachment structure, wherein the first strut end is present in a region below at least one of the bearing surfaces and the second strut end is present in a region above at least one of the bearing surfaces. Preferably, the backrest strut is articulated in the region of the two bearing surfaces in a pivotably movable manner on the seat substructure and/or in a pivotably movable manner on the attachment structure, wherein the first strut end is present in a region below the bearing surfaces and the second strut end is present in a region above the bearing surfaces. It is conceivable that the attachment structure is part of the seat substructure.

However, it is also conceivable that the seat substructure is configured as a standard seat substructure. For example, the seat substructure is simply a purchased part which is configured, in particular, in one piece. Advantageously, therefore, the seat substructure and the attachment structure are two parts which may be produced separately from one another and which, for example, are able to be captively connected to one another.

A bearing surface for the seat surface supporting structure advantageously extends in one plane. For example, the bearing surface of the seat substructure extends in a first plane and the bearing surface of the attachment structure extends in a further plane. Advantageously, the extension plane of the bearing surface of the seat substructure and the extension plane of the bearing surface of the attachment structure are oriented parallel to one another. For example, the two extension planes of the bearing surfaces of the seat substructure and the attachment structure coincide. One of the extension planes of the bearing surfaces is present, for example, at least approximately horizontally. "Approximately horizontally" is understood, for example, as an angular deviation from a horizontally oriented plane ranging between +10° and −10°, in particular, between +5° and −5°. The seat substructure is configured, for example, in a frame-like and/or box-like manner. The attachment structure and/or one of the bearing surfaces, in particular, both bearing surfaces, are, for example, present in the manner of a frame. Advantageously, elements of the seat substructure are configured from metal. For example, these elements are configured from tubes, in particular, square tubes, and/or profile elements, for example, L-shaped profiles, V-shaped profiles and/or U-shaped profiles.

The seat substructure advantageously comprises a horizontally extending attachment member which is configured to be connected to a vehicle floor of a vehicle. The attachment member advantageously extends along its longitudinal axis in the seating direction. The seat substructure further comprises two seat substructure supports which extend transversely to the bearing surface, transversely to the attachment structure and/or transversely to the attachment member. By means of the seat substructure supports, the attachment structure, in particular, the seat surface supporting structure, is present so as to be spaced apart and supported relative to the vehicle floor, for example, relative to the attachment member.

Preferably, the seat substructure further comprises a support foot which, for example, extends between the seat substructure supports. Starting from the attachment structure, the support foot advantageously runs downwardly to the front, in the direction of a seat substructure support and in the direction of the vehicle floor and/or in the direction of the attachment member. Advantageously, the support foot is configured and present on the seat substructure such that forces which occur on the seat frame in the event of a crash are able to be transmitted downwardly to the front. The attachment structure forms, for example, an upper frame of the seat substructure.

The first strut end of the backrest strut terminates, for example, in a region of the attachment member and/or the vehicle floor. It is conceivable that the seat substructure has two or more attachment members. Two attachment members and/or two seat substructure supports are advantageously connected together by a retaining element, for example, in the form of a transverse strut, which extends transversely to a seating direction of the seat frame and/or the vehicle seat of the seat frame. Advantageously, the backrest strut in the first use position bears with the first strut end against the retaining element, for example, the transverse strut, the attachment member and/or the vehicle floor.

The second strut end of the backrest strut advantageously terminates in a head and/or shoulder region of the seat frame and/or vehicle seat. For example, a head restraint of the vehicle seat may be arranged in the region of the second strut end.

It is further proposed that the seat substructure has a recess into which the seat surface supporting structure may engage, and/or the attachment structure has a recess into which the seat surface supporting structure may engage. For example, the seat surface supporting structure, at least in the first use position, engages into the recess, in particular, from above. It is also conceivable that the seat surface supporting structure engages in any position into the recess. It is also conceivable that the attachment structure and/or the seat substructure does not have a recess into which the seat surface supporting structure engages. For example, the seat surface supporting structure, in particular, in the first use position, bears against the bearing surface of the attachment structure and/or the bearing surface of the seat substructure. Advantageously, the bearing surface of the attachment structure and/or the bearing surface of the seat substructure has an inclination in the seating direction relative to a horizontal. The inclination of one of the bearing surfaces is approximately 0° to 10°, 0° to 7° or 3° to 7°. The inclination is approximately 1°, 2°, 3°, 4°, 6°, 7°, 8°, 9°, 10°, in particular, approximately 5°.

Preferably, at least a part of the recess forms a bearing surface for the seat surface supporting structure in the first use position. Viewed in the seating direction and starting from a first end which is located in the region of an articulation point of the backrest supporting structure on the seat substructure and/or on the attachment structure, the recess is advantageously present so as to run in a wedge-like manner in the seating direction, in the direction of a second end of the recess. The recess of the attachment structure is advantageously wedge-shaped, in particular, is configured to be triangular in a side view.

The backrest supporting structure is advantageously mounted in a rotatably movable manner on the seat substructure and/or mounted in a rotatably movable manner on the attachment structure. For example, the backrest supporting structure is rotatably connected to the seat substructure and/or the attachment structure via a rotary bearing, for example, a rotary joint. The rotary bearing, viewed in the vertical direction, is advantageously present in a region of the bearing surface of the seat substructure and/or in a region of the bearing surface of the attachment structure on the seat substructure and/or on the attachment structure.

It is also advantageous if the seat surface supporting structure in the first use position is mounted on the seat substructure, such that a seat surface element arranged on the seat surface supporting structure has a seat surface inclination relative to a horizontal.

Advantageously, a seat surface of the seat surface element, in particular, the seat surface supporting structure, in the first use position has an inclination of approximately 5° relative to a horizontal, in particular, relative to a vehicle floor. The seat surface element is present, for example, as a seat cushion of a vehicle seat on which a person is seated. The seat surface inclination in the first use position of the seat surface element is approximately between 1° to 10°, between 1° to 7° or between 3° to 7°. The seat surface inclination in the first use position of the seat surface element is approximately 1°, 2°, 3°, 4°, 6°, 7°, 8°, 9°, 10°, in particular, approximately 5°.

It also proves advantageous if the seat surface supporting structure in the second use position is mounted on the seat substructure and/or the attachment structure and on the backrest supporting structure, such that a seat surface of the seat surface element arranged on the seat surface supporting structure forms a plane with the horizontal.

Advantageously, a seat surface of the seat surface element, in particular, the seat surface supporting structure, relative to a vehicle floor in the second use position is not inclined relative to the horizontal. The seat surface inclination in the second use position is approximately between −1° to +1°, in particular, approximately, for example, exactly, 0° relative to the horizontal and/or an extension plane of the vehicle floor.

It is also advantageous if the backrest strut of the backrest supporting structure engages in a use position, in particular, in the second use position, into the recess of the seat substructure and/or into the recess of the attachment structure. For example, the backrest strut engages in the second use position, in particular, from below, into a recess, in particular, into both recesses and comes to bear against the seat surface supporting structure.

Advantageously, the attachment structure is configured in a U-shaped manner. For example, the attachment structure comprises a U-shaped profile. For example, the attachment structure comprises two side elements and a connecting element, wherein the connecting element connects the two side elements together, so that a U-shaped profile is formed. For example, a cutout in the connecting element forms the recess. Advantageously, the backrest strut passes through the attachment structure, in particular, the connecting element, in the first use position. For example, the backrest strut is arranged between the two side elements of the attachment structure. For example, the backrest strut bears against the attachment structure in the second use position, in particular, bears against the connecting element of the attachment structure.

It is further proposed that the backrest supporting structure, in particular, the backrest strut, in the second use position engages into a cavity of the seat substructure and/or into a cavity of the attachment structure. Advantageously, the U-shaped profile of the attachment structure, in particular, the side elements and the connecting element, forms a cavity into which the backrest supporting structure engages. For example, the recess forms a part of the cavity.

In an advantageous modification of the seat frame, the backrest supporting structure has two backrest struts, wherein the two backrest struts are connected together via a hinge. The hinge is configured, for example, as a latching hinge. In particular, the hinge comprises a locking portion. Advantageously, the two backrest struts of the backrest supporting structure are angled back relative to one another in the first use position of the seat frame. It is also advantageous if the two backrest struts in the first use position enclose an angle of less than 90°.

It is also advantageous if the two backrest struts in the second use position are oriented parallel to one another. For example, the two backrest struts of the backrest supporting structure in the second use position of the seat frame are present so as to run parallel to one another. Advantageously, a second backrest strut in the second use position, viewed in the direction of extension of the first backrest strut, forms a lengthening of the first backrest strut. Advantageously, the two backrest struts extend in the second use position in one plane.

It is also advantageous if a retaining element which limits a pivoting movement of a backrest strut, in particular, the first backrest strut, is present. The retaining element is configured, for example, as a retaining strap, for example, as a strap or belt strap and/or as a transverse strut, in particular, as the aforementioned transverse strut. Advantageously, the retaining element is present such that, in particular, in the event of a crash, a movement of the second strut end is prevented, in particular, blocked, starting from the first use position in the seating direction of the seat frame. The retaining element advantageously forms a stop for the backrest strut in the first use position. Advantageously, the retaining element blocks a pivoting movement, in particular, a rotational movement, in particular, of the first backrest strut, about an axis of the rotary bearing, in the first use position, in particular, in a single pivoting and/or rotational direction.

It has also proved advantageous if a latching element is present on a backrest strut, in particular, on the second backrest strut and/or on a second backrest element of the backrest supporting structure, the latching element being releasably latched to the seat substructure in the seating position, in particular, the first use position. For example, the second backrest strut and/or the second backrest element of the backrest supporting structure, is present in the first use position so as to be suspended on the seat substructure. The latching element is configured, for example, in the manner of a hook, for example, so as to be C-shaped or U-shaped. It is also conceivable that the latching element is configured as a magnetic element, for example, as a magnet. Advantageously, the second backrest strut in the first use position is present so as to be positioned with one end on the seat substructure and/or on the attachment structure. For example, the latching element is present as a pin and/or a bolt. Advantageously, the latching element in the first use position engages in a latching opening of the seat substructure and/or the attachment structure so that the backrest supporting structure in the first use position is releasably fixed. The latching element, for example, is movably arranged, for example spring-preloaded, on the backrest strut.

In an advantageous embodiment of the seat frame, the backrest supporting structure is configured in the manner of a frame. For example, the backrest supporting structure is configured as a frame. Advantageously, the backrest supporting structure comprises two first backrest struts and two second backrest struts. Advantageously, the two first and/or the two second backrest struts are configured so as to be spaced apart from one another. For example, the first and/or second backrest struts are connected together via a frame element of the backrest supporting structure. For example, a backrest element is a component of the frame.

An advantageous embodiment of the present invention is a seat arrangement of a vehicle comprising a seat frame according to one of the aforementioned variants.

Finally, the present invention relates to a vehicle comprising a seat arrangement and/or a seat frame according to one of the aforementioned embodiments. The vehicle is configured, for example, as a passenger motor vehicle, as a minibus, as a truck, as a motor home or as a camper van.

BRIEF DESCRIPTION OF THE DRAWINGS

A plurality of exemplary embodiments are described in more detail with reference to the following schematic drawings and by providing further details and advantages.

DETAILED DESCRIPTION OF THE INVENTION

Embodiments of the seat frame variants described below are able to be combined together in any manner. An individual embodiment of a described seat frame variant may be combined with a further seat frame variant, even if such a combination is not described below. Hereinafter, for the sake of simplicity, reference numerals of the same or similar elements are used consistently for the different seat frame variants.

Figure 1:
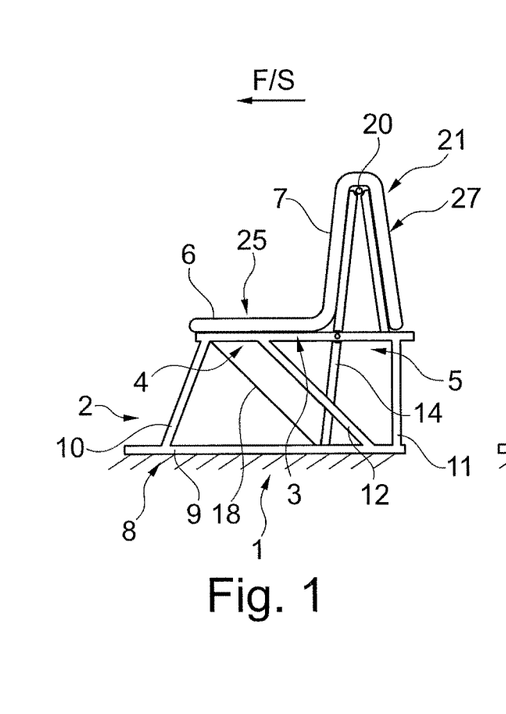
FIGS. 1 to 3 show a side view of a first variant of a seat frame in different use positions.
Figures 2, 3:
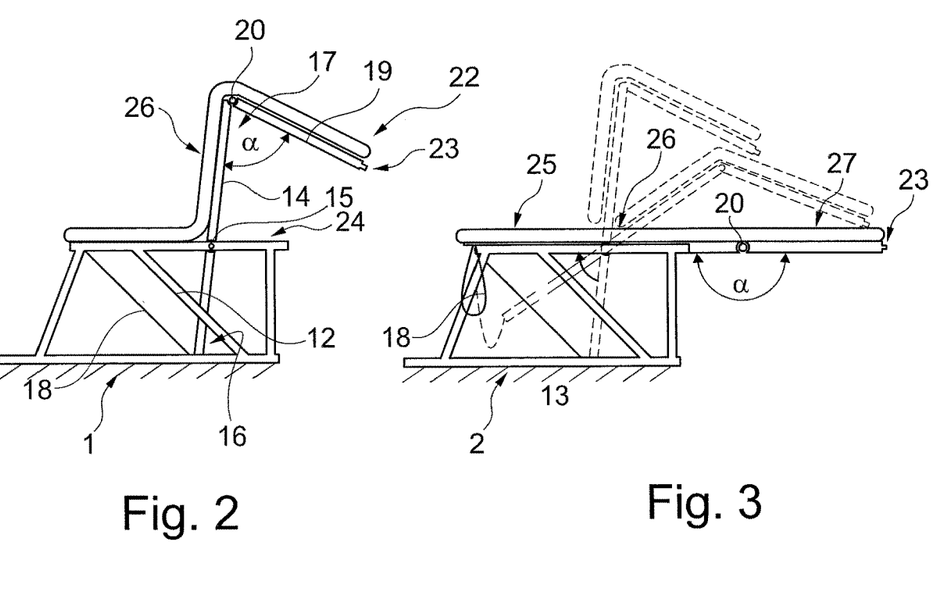

A seat frame 1 according to the present invention with a seat substructure 2, a seat surface supporting structure 3, an attachment structure 4, and a backrest supporting structure 5 are shown schematically in FIGS. 1 to 3. A seat surface element 6 and/or a backrest element 7 are arranged on the seat surface supporting structure 3 and on the backrest supporting structure 5. In the embodiment according to FIGS. 1 to 3, the seat surface element 6 and the backrest element 7, for example, are connected together, for example, configured in one piece. The seat surface element 6 and the backrest element 7 are present, for example, in the form of a seat cushion. The seat surface element 6 and the backrest element 7 are configured, for example, as an integral seat cushion. The seat frame 1 forms together with the seat surface element 6 and the backrest element 7 a vehicle seat 8 according to the present invention.

Due to the schematic view in FIGS. 1 to 3, a seat inclination of a seat surface of the seat surface element 6 in the first use position (FIGS. 1, 2) is not visible. Advantageously, however, a seat inclination is present.

The seat substructure 2 comprises amongst other things an attachment member 9, two seat substructure supports 10, 11 and a support foot 12. The elements of the seat substructure 2 are configured, for example, in the manner of a strut, for example, as metal or steel struts. For example, an element is present as a metal tube, in particular, as a square tube.

The attachment member 9 of the seat substructure 2 in the arranged state advantageously extends along the vehicle, in particular, parallel to a vehicle floor 13. The attachment member 9, for example, comprises connecting means 36, in order to connect the seat substructure 2 in a positionally fixed manner to the vehicle floor 13.

The two seat substructure supports 10, 11 of the seat substructure 2 advantageously run at least approximately vertically and connect the attachment member 9 to the attachment structure 4. The support foot 12 is advantageously arranged so as to run obliquely between the seat substructure supports 10, 11. Advantageously, the seat substructure supports 10, 11 and the support foot 12 form a common support plane. The support plane in the arranged state of the seat frame 1 on the vehicle floor 13 is present so as to be oriented, for example, perpendicular to an extension plane of the vehicle floor 13 and/or a longitudinal extent of the attachment member 9. An extension direction of the support plane, for example, is present in the vertical direction.

Figure 4:
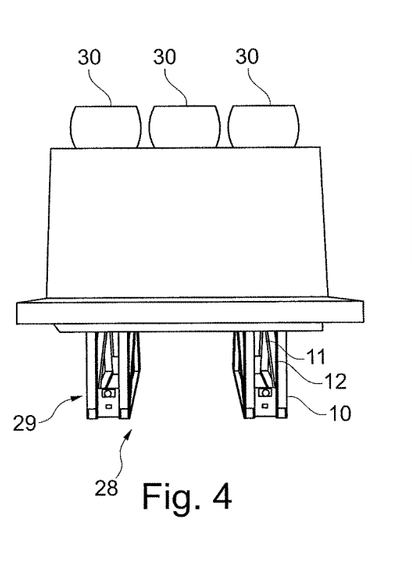
FIG. 4 shows a front view of a further variant of a seat frame with the arranged seat surface and backrest element.
Figure 5:
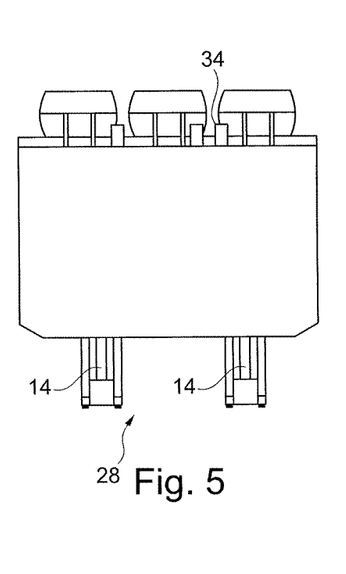
FIG. 5 shows a rear view of the seat frame according to FIG. 4.
Figure 6:
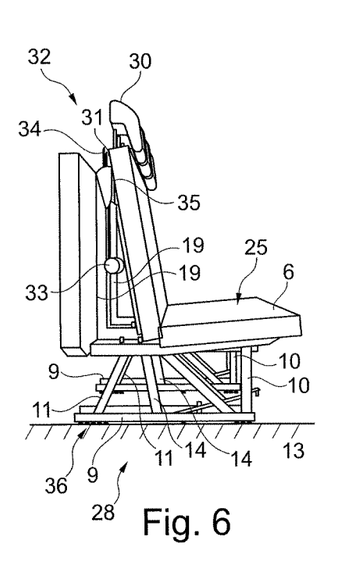
FIG. 6 shows a side view of the seat frame according to FIG. 4.

Advantageously, the seat substructure 2 comprises two, for example, four, front seat substructure supports 10 and two, for example, four, rear seat substructure supports 11 (FIGS. 4 to 6). The seat substructure supports 10, 11 are, for example, connected together by means of the attachment structure 4, viewed transversely to the seating direction S. It is also conceivable that the seat substructure supports 10, 11 are connected together by means of a transverse strut (not shown), in particular, in addition to the attachment structure 4.

A first backrest strut 14 of the backrest supporting structure 5 advantageously is articulated in a pivotably movable manner, in particular, a rotatable manner, on the seat substructure 2. Advantageously, the first backrest strut 14 is mounted in a rotatably movable manner via a rotary bearing 15 on the seat substructure 2. Advantageously, viewed in the vertical extension, a first end 16 of the first backrest strut 14 terminates in a region of the attachment member 9 and a second end 17 of the first backrest strut 14 terminates in a head or shoulder region of the vehicle seat 8 which is formed by the seat frame 1.

The seat substructure 2 further comprises a retaining member, for example, in the form of a belt strap 18. The belt strap 18 is advantageously connected by one end at the first end 16 of the first backrest strut 14 to the first backrest strut 14 and secured by a further end to the seat frame 1. By the belt strap 18 a pivoting movement of the first end 16 of the first backrest strut 14 is limited about a rotational axis of the rotary bearing 15 counter to a seating direction S, in particular, counter to a direction of travel F, of a vehicle on which the seat frame 1 is able to be arranged. As a result, in the event of a crash, the backrest is prevented from being folded down in the seating direction S and thus a user of the seat frame 1 is prevented from being jammed or squashed between the backrest element 7 and the seat surface element 6.

Preferably, the backrest supporting structure 5 comprises a second backrest strut 19. The first and the second backrest strut 14, 19 are, for example, connected together in an articulated manner by means of a latching hinge 20. For example, the first backrest strut 14 at the second end 17 is connected in an articulated manner to a first end 21 of the second backrest strut 19. The latching hinge 20 is configured, for example, to be self-securing, for example self-latching, so that the two backrest struts 14, 19 are adjustable relative to one another at different angles $\alpha$, in particular, latchable to one another. Advantageously, the longitudinal extensions of the first and the second backrest struts 14, 19 enclose with one another an angle $\alpha$, wherein the two longitudinal extensions advantageously intersect at a pivot point of the latching hinge 20.

A latching element 23 is configured at a second end 22 of the second backrest strut 19. In a first use position of the second backrest strut 19 according to FIGS. 1, 6, the second backrest strut 19 with the second end 22 is advantageously positioned on the seat substructure 2, for example, on the attachment structure 4 and/or the rear seat substructure support 11. Advantageously the latching element 23 in the first use position is releasably, in particular automatically, latched to the seat substructure 2. For example, the seat substructure 2 comprises a latching member 24 which is configured, for example, as an opening or a receiver to which the latching element 23 is able to be releasably locked. The latching element 23, for example, is movably arranged, in particular, preloaded by spring force, for example, in the form of a movable bolt or pin, at the second end 22 of the second backrest strut 19.

Advantageously, the backrest supporting structure 5 comprises a plurality of first backrest struts 14, for example, just two or just three first backrest struts 14. It is also conceivable that the backrest supporting structure 5 comprises a plurality of second backrest struts 19, for example, specifically two or specifically three second backrest struts 19. The plurality of first and/or second backrest struts 14, 19 are advantageously connected together in the manner of a frame. For example, the first and/or second backrest struts 14, 19 are connected together by means of the backrest element 7. Advantageously, the backrest element 7 is configured in two parts, wherein a first part of the two-part backrest element 7 is able to be connected to the first backrest strut 14 and a second part of the two-part backrest element 7 is able to be connected to the second backrest strut 19.

In FIGS. 1 to 3 (and/or FIGS. 9 to 14), an adjustment sequence of the seat frame 1, 37 from a first use position according to FIG. 1 (and/or FIG. 9) into a second use position according to FIG. 2 (and/or FIGS. 10 to 13) to a third use position according to FIG. 3 (and/or FIG. 14) is shown (see also the movement sequence corresponding to FIGS. 9 to 14). In the first use position according to FIG. 1, the seat frame 1 and, in particular, the backrest struts 14, 19 in a position locked by the latching element 23 are located on the seat frame 1. The first use position is also at the same time a seating position. In the second use position, a locking of the second backrest strut 19 to the seat frame 1 is released and the second backrest strut 19, for example, rotates relative to the first backrest strut 14 about the rotational axis of the latching hinge 20. As a result, an angle α between the first backrest strut 14 and the second backrest strut 19 is increased. By the release of the second backrest strut 19 from the locked position and the pivoting of the second backrest strut 19, a pivoting and/or rotational movement of the first backrest strut 14 about the axis of the rotary bearing 15 is released. In the side view of the seat frame 1, 37 according to FIGS. 1 to 3 (and/or FIGS. 9 to 14) a clockwise rotation of the first backrest strut 14 is possible, as a result. By pivoting the first backrest strut 14 and by further movement of the second backrest strut 19 relative to the first backrest strut 14, the third use position according to FIG. 3 (and/or FIG. 14) is reached. In FIG. 3 (and/or in FIGS. 10 to 14), the movement sequence into the third use position is indicated schematically. The third use position is at the same time a reclining position of the seat frame 1. In the third use position, a reclining surface consisting of a seat surface 25 of the seat surface element 6 and a backrest surface 26, 27 is present in the flattened state. The latching hinge 20 latches the two backrest struts 14, 19 together in the third use position, so that the longitudinal extensions of the backrest struts 14, 19 extend parallel to one another. Advantageously, the second backrest strut 19 forms in the reclining position a lengthening of the first backrest strut 14. In the reclining position, the two backrest struts 14, 19 are advantageously at an angle α of approximately 180° to one another. Advantageously, the plurality of backrest struts 14, 19 in the third use position form a reclining plane. The reclining plane is advantageously configured as a horizontal plane, so that the seat surface 25 and the backrest surfaces 26, 27 form a flat reclining surface.

FIGS. 4 to 6 show a seat arrangement with a further variant of a seat frame 29 in the form of a vehicle seat bench 28. The vehicle seat bench 28 is similar in terms of basic elements to the previously described seat frame 1. The vehicle seat bench 29 comprises, for example, head restraints 30. The head restraints 30 are removably arranged on the vehicle seat bench 28. For example, the head restraints 30 may be plugged into corresponding receivers 31 of the vehicle seat bench 28 in the known manner in an upper region of the vehicle seat bench 28. The vehicle seat bench 28 further comprises, for example, a safety belt system 32 consisting of a belt retractor 33, a belt deflector 34, a belt 35 and a belt buckle (not shown). The belt retractor 33 is, for example, mounted on the second backrest strut 19.

It is shown in FIG. 6 that in the first use position, the seating position, the seat surface 25 of the seat surface element 6 has an inclination relative to the vehicle floor 13 and/or relative to an extension plane of the attachment members 9.

Figure 7:
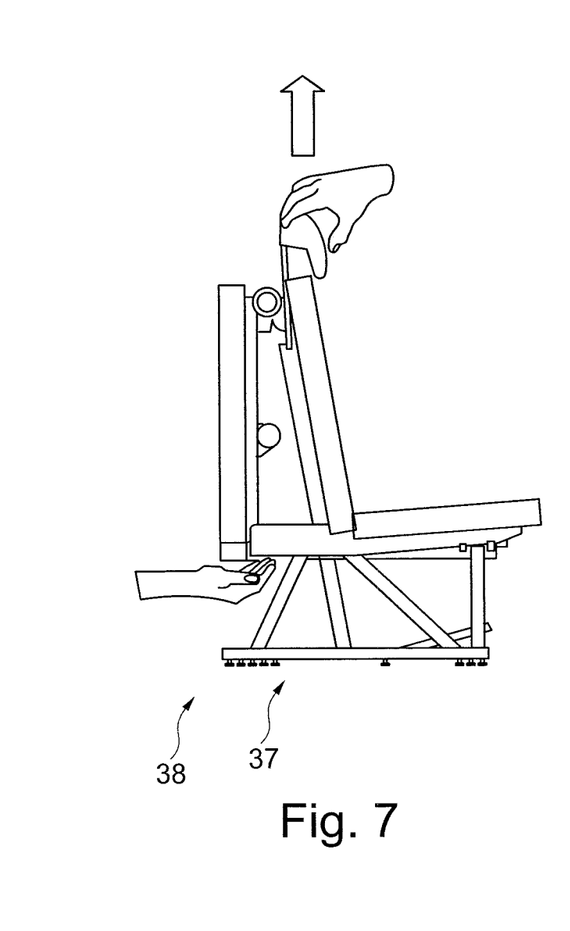
FIGS. 7 and 8 show a side view of the seat frame according to FIG. 4, wherein in FIGS. 7 and 8 a schematic adjustment sequence of the seat frame from a first use position into a second use position is shown.
Figure 8:
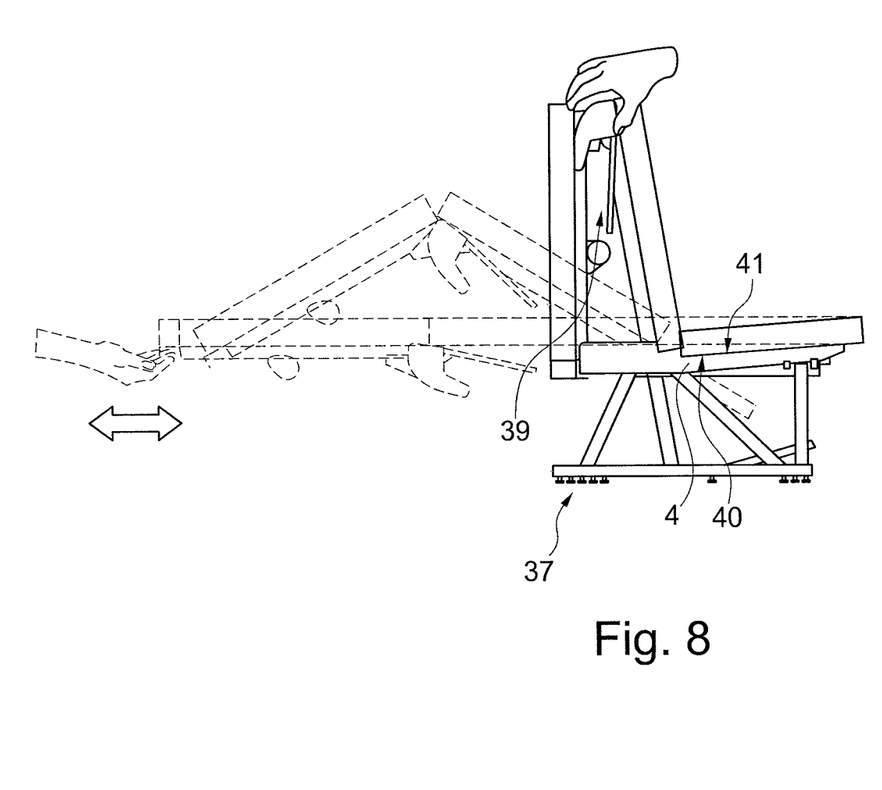
Figure 9:
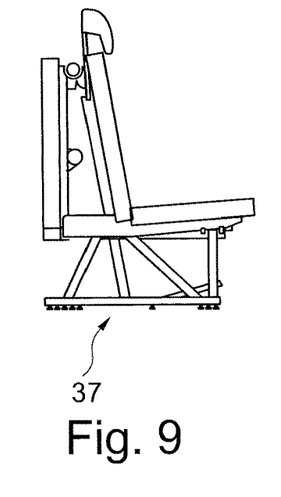
FIGS. 9 to 14 show a side view of the seat frame according to FIG. 4, wherein steps of the adjustment sequence according to FIGS. 7 and 8 are shown in the individual figures.
Figure 10:
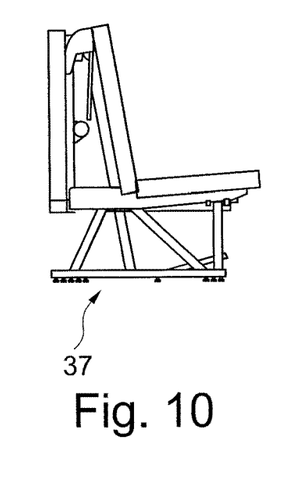
Figure 11:
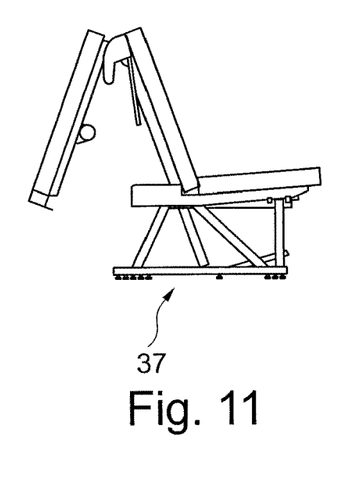
Figure 12:
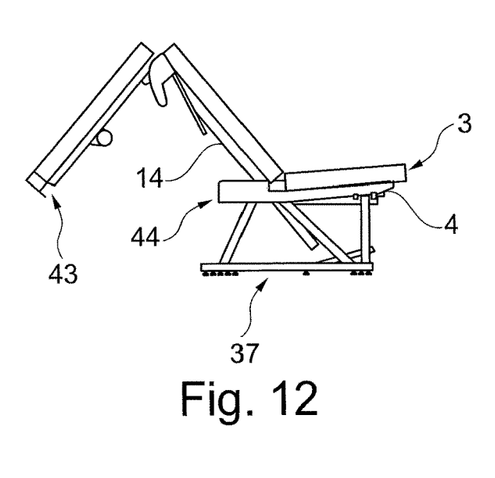
Figure 13:
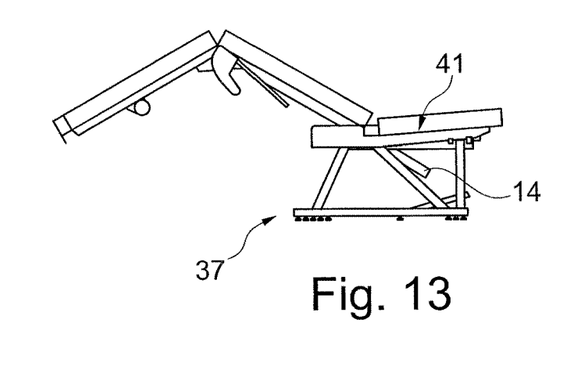

In FIGS. 7 and 8 and/or 9 to 14, a further variant of a seat frame 37 in the form of a vehicle seat 38 is shown. FIGS. 7 to 14 show in this case the seat frame 37 in different use positions.

It may be derived from FIGS. 7 and 8 that before starting an adjustment movement of the backrest struts 14, 19 from the seating position into the reclining position, the head restraint 30 has to be removed from a working position at the upper end 17 of the first backrest strut 14, in order to be able to implement the adjustment movement of the backrest struts 14, 19. The head restraint 30 may be arranged and stored, for example, on a rear storage region 39 on the first backrest strut 14.

A latching element 43 of the seat frame 37 of FIGS. 7 to 14 is configured to be U-shaped, in particular, in the manner of a clip. As a result, the latching element 43 is configured so as to be able to be clipped and/or suspended on an end region 44 of the attachment structure 4, whereby the first backrest strut 14 is able to be fixed in the seating position.

In FIG. 8, it is also shown that the attachment structure 4 has a recess 40. The recess 40 is configured in the manner of a wedge. In the seating position, the seat surface element 6 bears against a bearing surface 41 of the recess 40, so that it has an inclination relative to the vehicle floor 13 and/or relative to an extension plane of the attachment members 9.

In the reclining position (FIGS. 8 and 14) of the seat frame 37, the first backrest strut 14 acts on the seat surface supporting structure 3 and, in particular, on the seat surface element 6 and at the same time forces the seat surface element 6 out of the first use position (seating position) into the second use position (reclining position). In this case, the seat surface supporting structure 3, for example, is pivotably coupled in a front region 42 of the seat frame 37, in particular, movably in a front region of the attachment structure 4. Viewed in the seating direction, the front region of the attachment structure 4 is advantageously present opposite and spaced apart from the end region 44 of the attachment structure 4.

Figure 14:
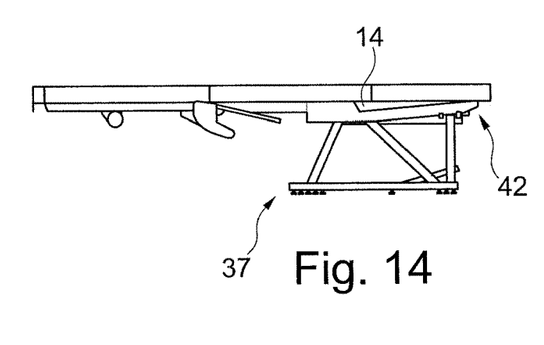

For example, in the reclining position, the first backrest strut 14 engages from below into the recess 40, so that the first backrest strut 14 acts on a lower end of the seat surface element 6 and the seat surface element 6 rises at one end in the vertical direction. As a result, an inclination of the seat surface element 6 which is present in the seating position, in particular, the seat surface 25 of the seat surface element 6, is lifted relative to a horizontal plane and the seat surface 25 is located approximately in a horizontal plane and forms with the backrest surfaces 26, 27 of the backrest element 7 a planar, flat reclining surface.

LIST OF REFERENCE NUMERALS

1 Seat frame
2 Seat substructure
3 Seat surface supporting structure
4 Attachment structure
5 Backrest supporting structure
6 Seat surface element
7 Backrest element
8 Vehicle seat
9 Attachment member
10 Seat substructure support
11 Seat substructure support
12 Support foot
13 Vehicle floor
14 Backrest strut
15 Rotary bearing
16 End
17 End
18 Belt strap
19 Backrest strut
20 Latching hinge
21 End
22 End
23 Latching element
24 Latching member
25 Seat surface
26 Backrest surface
27 Backrest surface
28 Vehicle seat bench
29 Seat frame
30 Head restraint
31 Receivers
32 Safety belt system
33 Belt retractor
34 Belt deflector
35 Belt
36 Connecting means
37 Seat frame
38 Vehicle seat
39 Storage region
40 Recess
41 Bearing surface
42 Region
43 Latching element
44 End region

The invention claimed is:

1. A seat frame for a seat arrangement of a vehicle, wherein the seat frame comprises a seat substructure, a seat surface supporting structure, an attachment structure, a backrest supporting structure and a latching element on a backrest strut of the backrest supporting structure, wherein the seat substructure is configured to be arranged on a vehicle floor of a vehicle, wherein the seat surface supporting structure is configured to fasten a seat surface element of the seat arrangement thereto, wherein the seat surface supporting structure is movably articulated on the seat substructure and/or movably articulated on the attachment structure, wherein the backrest supporting structure is configured to fasten a backrest element of the seat arrangement thereto, wherein the backrest supporting structure is articulated on the seat substructure in a pivotably movable manner and the latching element is releasably latched to the seat substructure in a seating position, wherein the backrest supporting structure is pivotable out of a first use position of the seat frame into a second use position of the seat frame, wherein in the second use position the backrest supporting structure acts on the seat surface supporting structure and forces the seat surface supporting structure out of the first use position into the second use position.

2. The seat frame for a seat arrangement of a vehicle as claimed in claim 1, wherein the attachment structure further comprises a bearing surface for the seat surface supporting structure, wherein the backrest strut of the backrest supporting structure extends in a first use position transversely to the bearing surface of the attachment structure from a first strut end to a second strut end, wherein the backrest strut is articulated in the region of the bearing surface in a pivotably movable manner on the seat substructure, wherein the first strut end is present in a region below the bearing surface and the second strut end is present in a region above the bearing surface.

3. The seat frame for a seat arrangement of a vehicle as claimed in claim 1, wherein the attachment structure further comprises a recess into which the seat surface supporting structure engages and/or the seat substructure has a recess into which the seat surface supporting structure may engage.

4. The seat frame for a seat arrangement of a vehicle as claimed in claim 1, wherein the seat surface supporting structure in the first use position is mounted on the seat substructure, such that a seat surface element arranged on the seat surface supporting structure has a seat surface inclination relative to a horizontal.

5. The seat frame for a seat arrangement of a vehicle as claimed in claim 1, wherein the seat surface supporting structure in the second use position is mounted on the seat substructure and on the backrest supporting structure, such that a seat surface of the seat surface element arranged on the seat surface supporting structure forms a plane with the horizontal.

6. The seat frame for a seat arrangement of a vehicle as claimed in claim 3, wherein the backrest strut of the backrest supporting structure engages in a second use position into the recess of the attachment structure.

7. The seat frame for a seat arrangement of a vehicle as claimed in claim 1, wherein the backrest supporting structure in the second use position engages into a cavity of the seat substructure and/or into a cavity of the attachment structure.

8. The seat frame for a seat arrangement of a vehicle as claimed in claim 1, wherein the backrest supporting structure has two backrest struts, wherein the two backrest struts are connected together via a hinge.

9. The seat frame for a seat arrangement of a vehicle as claimed in claim 8, wherein the two backrest struts in the first use position enclose an angle $\alpha$ of less than 90°.

10. The seat frame for a seat arrangement of a vehicle as claimed in claim 8, wherein the two backrest struts in the second use position are oriented parallel to one another.

11. The seat frame for a seat arrangement of a vehicle as claimed in claim 1, further comprises a retaining element which limits a pivoting movement of the backrest strut.

12. The seat frame for a seat arrangement of a vehicle as claimed in claim 1, wherein the backrest supporting structure is configured in the manner of a frame.

13. A seat arrangement of a vehicle comprising a seat frame as claimed in claim 1.

14. A vehicle comprising a seat arrangement as claimed in claim 13.

15. The seat frame for a seat arrangement of a vehicle as claimed in claim 2, wherein the backrest strut in the second use position engages into a cavity of the seat substructure and/or into a cavity of the attachment structure.

16. The seat frame for a seat arrangement of a vehicle as claimed in claim 1, wherein the latching element is releasably latched to the seat substructure in the first use position.

* * * * *